UNITED STATES PATENT OFFICE.

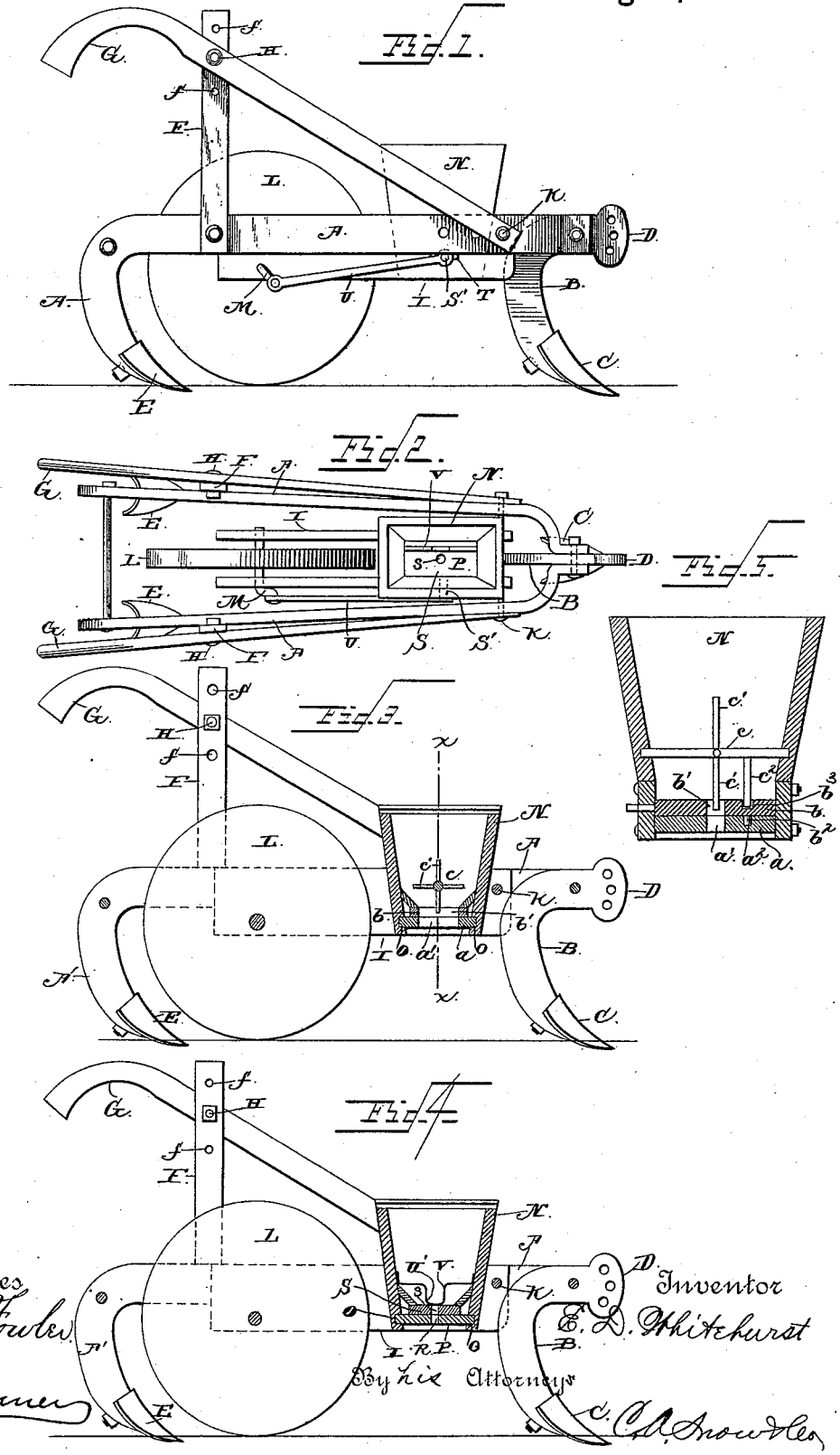

ESIR DAVID WHITEHURST, OF GLEN ROSE, TEXAS.

PLANTER.

SPECIFICATION forming part of Letters Patent No. 346,793, dated August 3, 1886.

Application filed May 26, 1886. Serial No. 203,318. (No model.)

*To all whom it may concern:*

Be it known that I, ESIR DAVID WHITEHURST, a citizen of the United States, residing at Glen Rose, in the county of Somervell and State of Texas, have invented a new and useful Improvement in Planters, of which the following is a specification, reference being had to the accompanying drawings.

My invention relates to an improvement in cotton and corn planters; and it consists in the peculiar construction and combination of devices that will be more fully set forth hereinafter, and particularly pointed out in the claims.

In the drawings, Figure 1 is a side elevation of a corn and cotton planter embodying my improvements. Fig. 2 is a top plan view of the same. Fig. 3 is a vertical sectional view of my invention when used as a cotton-planter. Fig. 4 is a similar view of the same when used as a corn-planter. Fig. 5 is a vertical transverse sectional view taken on the line $x\ x$ of Fig. 3.

A represents a pair of side beams, between the front ends of which is secured a curved standard, B, carrying the furrow-opener or shovel C. The upper portion of the curved standard B extends forwardly for a short distance beyond the side beams, A, and forms a clevis, D. The rear ends of the beams A are curved downwardly, thereby forming standards A', to which are attached covering-plows E. Near the rear ends of the side beams, A, are bolted vertical supporting-arms F, which are provided at their upper ends with vertical series of openings $f$.

G represents handles, which are similar to plow-handles, and have their front ends bolted near the front ends of the side beams, A, and their rear ends secured to the supporting-arms F at any desired elevation by means of bolts H, which pass through openings made in the handles and through either of the openings $f$. By this construction it will be readily understood that the plow-handles may be adjusted up or down to suit the convenience of the person using the machine.

I represents a pivoted frame, which is composed of two parallel side bars having their front ends pivoted on a bolt, K, between the beams A, near the front ends of the latter. In the rear end of the frame I is journaled a supporting-wheel, L, which is provided with a crank, M.

In between the front ends of the side bars which constitute the frame I is secured a hopper, N, the said hopper being bolted between the side bars of the frame I. The sides of the hopper converge toward the lower end thereof, and on the opposing sides of the front and rear walls of the hopper are made horizontal transverse grooves O, in which is secured a removable bottom board, P, which forms the bottom of the hopper. Through the center of this board is made an opening, R.

S represents a sliding block, which is provided with a central opening, $s$, and is placed on the upper side of the bottom board, P. This sliding block is provided near one end with an outwardly-extending arm, S', which projects through the longitudinal slot T, with which one side of the frame I is provided. To the said arm S' is attached the front end of a pitman, U, which has its rear end connected to the crank M.

V represents a spring, which is secured between the front and rear walls of the hopper, near the bottom thereof, and is provided at its center with a depending U-shaped arm, U', which bears on the upper side of the slide S.

When thus equipped the machine is adapted for planting corn. As the wheel L rotates, a reciprocating motion is imparted to the slide S, through the crank M and the pitman U, and the seeds which are placed in the hopper are fed through the opening R, in the bottom of the same, into the furrow made by the furrow-opener C. The covering-shovels E, which work on opposite sides of the wheel L, throw the earth toward the furrow and form a ridge over the seeds, as will be very readily understood. As the frame I is pivoted between the side beams, A, at its front end, it will be readily understood that a vibrating motion will be imparted to the said frame, owing to the inequalities of the ground as the machine advances, thereby agitating the seeds in the hopper and preventing them from becoming lodged therein.

In order to adapt the machine for planting cotton, the bottom board, P, the slide S, and the spring V are removed from the lower sides of the hopper, and in lieu thereof are inserted a bottom board, $a$, a slide, $b$, and an oscillating stirrer, $c$, as shown in Figs. 3 and 5. The bottom board, $a$, is provided centrally with a longitudinal slot, $a'$, and alongside the said slot is made a longitudinal groove, $a^2$. The slide $b$ is provided with a central longitudinal slot, $b'$, and a depending stud, $b^2$, which enters the groove $a^2$. On the opposite side from the stud $b^2$ is a recess, $b^3$. The said slide is also provided with a projecting arm adapted to be attached to the front end of the pitman the same as the corn-slide S. The stirrer $c$ comprises a rock-shaft, which is journaled in openings made in the side walls of the hopper, and is provided with radial stirring-arms $c'$, which extend upwardly from the rock-shaft in the bottom of the hopper and downwardly from the said shaft in the slot $b'$. An arm, $c^2$, also extends from the rock-shaft and enters the recess $b^3$ of the slide $b$, so as to impart an oscillating motion to the rock-shaft when the said slide is reciprocated, as will be very readily understood. The function of the stirring-arms is to force the cotton-seeds downwardly through the slots $b'$ and $a'$ when the machine is operated.

Having thus described my invention, I claim—

1. The combination of the beams A, having the furrow-opener secured between their front ends and the covering-plows attached to the rear ends of the beams, with the frame I, pivoted between the beams A at its front end, and having the supporting-wheel provided with the crank M, the hopper secured to the frame I, the reciprocating seed-slide in the bottom of the hopper, and having the arm or pin projecting through a slot in the side thereof, the pitman having one end pivoted to the said arm or pin, and the other end attached to the crank M, whereby the seed-slide is operated by the supporting-wheel, and the reciprocating stirrer $c$, journaled in the hopper, and having the depending arm engaging the slide, whereby the said stirrer is operated by the slide, substantially as described.

2. The combination, in a cotton-planter, of the hopper having the bottom board, $a$, provided with the slot $a'$ and the groove $a^2$, the slide $b$, bearing on the bottom board, $a$, and having the slot $b'$, the depending stud $b^2$, engaging the groove $a^2$, and the oscillating stirrer $c$ above the slide $b$, and having the arm $c^2$ engaging the slide, substantially as described.

In testimony that I claim the foregoing as my own I have hereto affixed my signature in presence of two witnesses.

ESIR DAVID WHITEHURST.

Witnesses:
D. L. CARMICHAEL,
J. A. KINCAID.